United States Patent [19]

Mislin et al.

[11] 3,981,858
[45] Sept. 21, 1976

[54] ALKOXY- AND CYCLOHEXYLOXYCARBONYLAMINOPHENYL-AZO-HYDROXYNAPHTHALENES CONTAINING AT LEAST ONE SULFO GROUP

[75] Inventors: Roland Mislin, Saint-Louis, France; Hanspeter Uehlinger, Basel, Switzerland

[73] Assignee: Sandoz Ltd., Basel, Switzerland

[22] Filed: Jan. 15, 1973

[21] Appl. No.: 323,621

[30] Foreign Application Priority Data
Jan. 20, 1972  Switzerland............................ 823/72

[52] U.S. Cl................................. 260/201; 260/202
[51] Int. Cl.²........................................ C07C 107/04
[58] Field of Search........................... 260/201, 202

[56] References Cited
UNITED STATES PATENTS

| | | | |
|---|---|---|---|
| 1,731,643 | 10/1929 | Wagner et al. | 260/199 |
| 2,155,493 | 4/1939 | Knight et al. | 260/201 |
| 2,276,174 | 3/1942 | Fleischhauer et al. | 260/199 |
| 2,447,163 | 8/1948 | Conzetti | 260/199 |
| 3,121,712 | 2/1964 | Berrie et al. | 260/198 |
| 3,142,669 | 7/1964 | Feeman | 260/199 |
| 3,218,310 | 11/1965 | Benz et al. | 260/201 |
| 3,222,354 | 12/1965 | Lange | 260/201 |
| 3,282,779 | 11/1966 | Pensack et al. | 260/559 |

FOREIGN PATENTS OR APPLICATIONS
1,076,805  10/1954  France............................. 260/199

*Primary Examiner*—Henry R. Jiles
*Assistant Examiner*—R. W. Ramsuer
*Attorney, Agent, or Firm*—Gerald D. Sharkin; Richard E. Vila; Melvyn M. Kassenoff

[57] ABSTRACT

Azo dyes bearing at least one sulphonic acid group and of formula I,

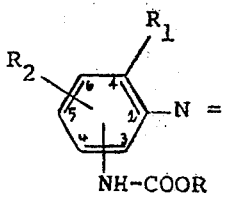

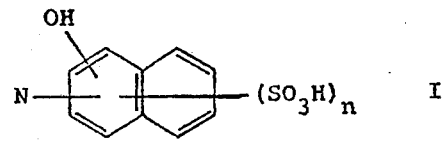

in which
R signifies an alkyl radical of 6 to 18 carbon atoms or a cyclohexyl radical,
$R_1$ signifies hydrogen, halogen, alkyl, or —$SO_3H$,
$R_2$ signifies hydrogen, halogen or alkyl, and
$n$ signifies 0, 1 or 2, which compounds, in free acid or salt form, dye textiles, paper and leather. The dyeings have good light fastness, especially on polyamides and basic dyeable polypropylene, and good fastness to wet treatments, rubbing, gas fumes and dry cleaning. The dyes have good build-up power, are well-soluble in hot and cold water and reserve polyesters and polyacrylonitrile.

38 Claims, No Drawings

ALKOXY- AND CYCLOHEXYLOXYCARBONYLAMINOPHENYL-AZO-HYDROXYNAPHTHALENES CONTAINING AT LEAST ONE SULFO GROUP

The invention relates to azo dyes bearing at least one sulphonic acid group.

The invention provides compounds of formula I,

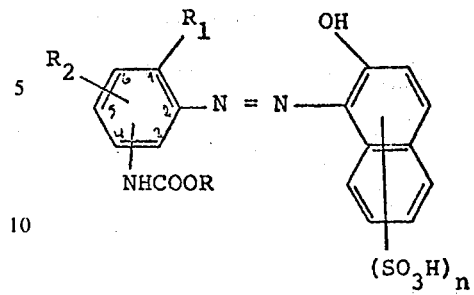

Ib

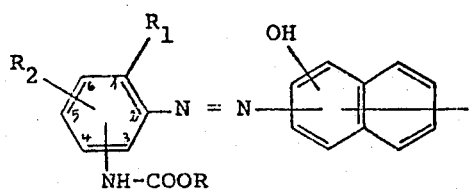

I in which
R signifies a substituted or unsubstituted straight or branched chain alkyl radical of 6 to 18 carbon atoms or a substituted or unsubstituted cyclohexyl radical,
$R_1$ signifies a hydrogen atom, a halogen atom, a substituted or unsubstituted straight or branched chain alkyl radical of 1 to 18 carbon atoms or the group $-SO_3H$,
$R_2$ signifies a hydrogen atom, a halogen atom, or a substituted or unsubstituted straight or branched chain alkyl radical of 1 to 18 carbon atoms,
$n$ signifies 0, 1 or 2, with the proviso that the compounds contain at least one $SO_3H$ group, which compounds may be in free acid or salt form.

As representative of the compounds of formula I may be given compounds of formula Ia,

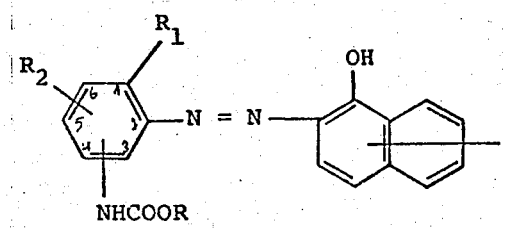

Ia in which
R, $R_1$, $R_2$, $n$ and the proviso are as defined above; compounds of formula Ib, in which
R, $R_1$, $R_2$, $n$ and the proviso are as defined above; compounds of formula Ib'

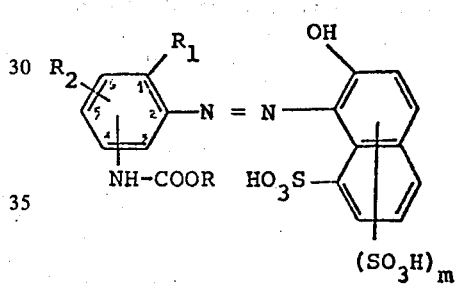

Ib' in which
R, $R_1$ and $R_2$ are as defined above, and $m$ signifies 0 or 1;
compounds of formula Ic,

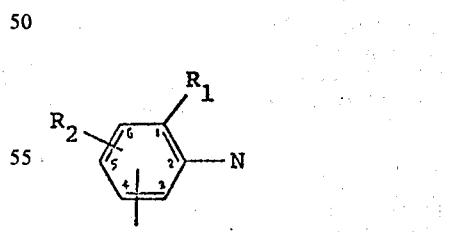

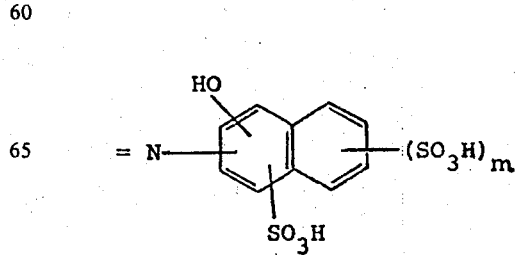

Ic in which
R, R₁, R₂ and m are as defined above; and
compounds of formula Ic'

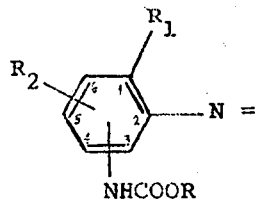

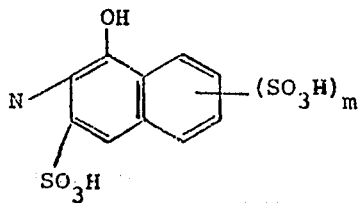

in which
R, R₁, R₂ and m are as defined above.

The invention also provides a process for the production of compounds of formula I a. reacting the aminomonoazo compound of formula II,

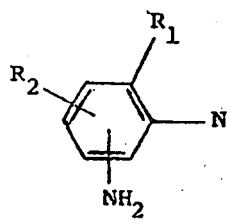

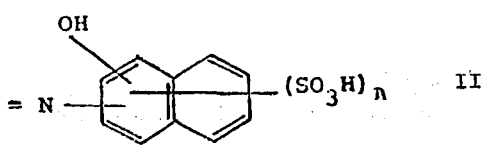

in which
R₁, R₂ and n are as defined above,
with a haloformate of formula III,

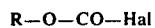    III in which
R is as defined above, and
Hal signifies a halogen atom, or b. coupling the diazo compound derived from an amine of formula IV,

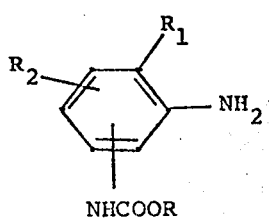

in which
R, R₁ and R₂ are as defined above,
with a compound of formula V,

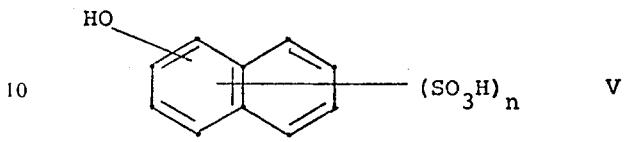

in which n is as defined above.

Process (a) is conveniently carried out in conventional manner, preferably in an alkaline medium in the pH range of from 8 to 14, for example, in the presence of a coupling accelerant.

Similarly, process (b) is conveniently carried out in conventional manner, e.g. in water and in the presence of an acid binding agent.

In the compounds of formula I and, of course, in the compounds of formula Ia, Ib, Ib', Ic and Ic', the group —NH—COOR is preferably bonded at the indicated 4- or 5-position of the phenyl nucleus to which it is attached. Also, the compounds preferably bear two sulphonic acid groups.

Where R signifies a substituted or unsubstituted alkyl radical, such preferably is of 8 to 12 carbon atoms. Where R signifies a substituted cyclohexyl radical, the cyclohexyl radical is preferably substituted by up to three substituents selected from alkyl of 1 to 6 carbon atoms, e.g. methyl, ethyl, n-propyl, iso-propyl or tert-butyl, alkoxy of 1 to 6 carbon atoms and halogen. Among the preferred significances of R are unsubstituted straight and branched chain alkyl radicals of 6 to 18 carbon atoms, unsubstituted cyclohexyl radicals and cyclohexyl radicals substituted by up to three methyl radicals.

Where R₁ or R₂ signifies a substituted or unsubstituted alkyl radical, such preferably is of 1 to 6 carbon atoms, e.g. methyl, ethyl, propyl or butyl. Among the preferred significances of R₁ and R₂ are substituted and unsubstituted straight and branched chain alkyl radicals of 1 to 6 carbon atoms, unsubstituted straight and branched chain alkyl radicals of 1 to 18 carbon atoms and halogen atoms. The most preferred significances of R₁ include hydrogen atoms, chlorine atoms and sulphonic acid groups and the most preferred significances of R₂ include hydrogen atoms, unsubstituted alkyl radicals of 1 to 6 carbon atoms (especially methyl radicals) and halogen atoms (especially chlorine atoms).

As examples of substituents on any alkyl groups in the compounds of formula I may be given halogen, hydroxyl, cyano, alkoxy of 1 to 6 carbon atoms and aryl, e.g. phenyl or naphthyl, which aryl radicals may be unsubstituted or substituted, e.g. by up to two substituents selected from halogen, cyano, nitro, hydroxyl, trifluoroalkyl of 1 to 6 carbon atoms, trichloroalkyl of 1 to 6 carbon atoms, alkyl of 1 to 6 carbon atoms, cycloalkyl of 5 to 7 carbon atoms, aryl, e.g. phenyl or naphthyl, alkoxy of 1 to 6 carbon atoms, aryloxy, carbalkoxy, acylamine of up to 6 carbon atoms unsubstituted, monosubstituted or disubstituted sulphonamide, substituted or unsubstituted alkyl sulphonyl or arylsulfonyl carboxylic acid or sulphonic acid ester, unsubstituted or substituted carbonamide or sulphonic acid groups.

Any halogen atoms in the compounds of formula I may be bromine, fluorine or iodine, but are preferably chlorine. As examples of the salt forms of the compounds of formula I may be given the alkali metal salt forms and the ammonium salt forms. The preferred form being the sodium salt form.

The compounds of formula I are useful as dyes, principally for exhaust dyeing, pad dyeing and printing of textile materials comprising natural or synthetic polyamide fibres, polyvinyl alcohol fibres, basic dyeable polypropylene fibres, basic dyeable polyacrylonitrile fibres, polyurethane fibre and natural and regenerated cellulosic fibres, which fibres may, for example, be in loose, yarn or fabric form.

The principal natural polyamide fibres are wool and silk and the main synthetic polyamides are those synthesized by condensation polymerisation of dibasic acids, e.g. adipic or sebacic acid, and hexamethylene diamine, ω-aminoundecylic acid or poly-ε-caprolactam.

The compounds of formula I are also suitable for dyeing and printing paper and leather.

The compounds of formula I can be incorporated into stable dyeing preparations in granulated or liquid form. They are normally applied from a neutral to acid medium in the pH range of from 2 to 7, preferably from 4 to 5, in the presence of an acid, e.g. an organic acid such as acetic or formic acid.

The compounds of formula I give dyeings of good light fastness, particularly on polyamide fibres and basic dyeable polypropylene fibres and good wet fastness, e.g. to washing, water, sea-water, perspiration, acid, alkali, milling and potting. The compounds show good levelling properties, have good neutral affinity, are well soluble in hot and cold water and cover barry nylon. The dyeings show good fastness to rubbing, gas fumes and dry cleaning, have good power of build up and migrate well. The dyes show little sensitivity to metal ions in the dyebath, in particular to calcium ions, have good fastness to formaldehyde and reserve synthetic polyester and polyacrylonitrile fibres The compounds of formula I may be used alone, in combination with one another or in combination with other dyes, e.g. with anthraquinone dyes. Such combination dyeings also have good light and wet fastness. The dyeings are not subject to catalytic fading but fade tone-in-tone on exposure to light.

The following Examples, in which parts and percentages are by weight, and the temperatures in degrees Centigrade, illustrate the invention.

EXAMPLE 1

The dye of the formula

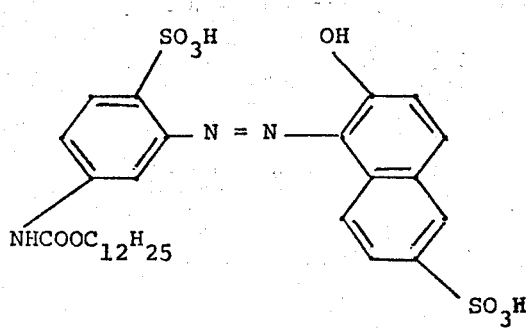

can be produced as follows. 20 Parts of 2-amino-4-carbododecyloxyaminobenzene-1-sulphonic acid (obtained by reaction of 2,4-diaminobenzene-1-sulphonic acid with chloroformic acid dodecyl ester) are dissolved in 300 parts of water at room temperature with the addition of 6.7 parts of 30% aqueous sodium hydroxide solution. 3.5 Parts of sodium nitrite are added with stirring until everything has gone into solution. In 30 minutes a solution of 30 parts of concentrated hydrochloric acid in 150 parts of water is added dropwise at 0.5° with stirring. The diazo suspension is stirred for 1 hour at 0.5° and then dropped into a solution of 11.2 parts of 2-hydroxynaphthalene-6-sulphonic acid and 30 parts of 30% sodium hydroxide solution in 100 parts of water at a controlled temperature of −10°. During the dropwise addition, care is taken to prevent the pH of the coupling mixture decreasing to below 10. The coupling mixture is subsequently stirred for 3 hours, during which time the temperature gradually increases to 20°. The pH of the coupling mixture is then adjusted to 7 with hydrochloric acid and the precipitated dye is isolated by filtration and dried at 100°. It is obtained as a yellow powder which is applicable from neutral to weakly medium to wool and synthetic polyamide fibres, on which it gives dyeings of brilliant orange shade with good light, water and milling fastness.

The same dye can be produced as follows. 23.3 Parts of the monoazo dye formed by coupling diazotized 2-amino-4-acetylaminobenzene-1-sulphonic acid with 2-hydroxynaphthalene-6-sulphonic acid are dissolved in the form of the disodium salt in 500 parts of water at 85°. After the addition of 25 parts of concentrated hydrochloric acid the solution is stirred for 3 hours at the same temperature. The reaction mixture is then allowed to cool to room temperature and the precipitated deacylated dye is filtered, washed until neutral, dissolved in 800 parts of water and 5 parts of soda, and the solution raised to 50°. In 3 hours 25 parts of chloroformic acid dodecyl ester are dropped in, together with aqueous soda solution to keep the otherwise gradually decreasing pH between 7.5 and 8 throughout the reaction. The solution is stirred further at this temperature for 5 hours and then cooled. The precipitated dye is filtered with suction, washed with ice-water and dried at 100°. It dyes natural and synthetic polyamide fibres in brilliant orange shades with good wet fastness properties.

The structural compositions of further dyes is given in the following Table. They are produced in accordance with Example 1 and have the formula

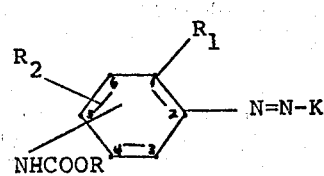

where R, R₁, R₂ and the coupling component K have the meanings given in the table. The shade of the dyeing on synthetic polyamide fibre is noted in the final column.

| Exp. No. | R | R₁ | R₂ (position in the ring A) | Position of the radical NHCOOR in the ring A | Coupling Component K | Shade on Polyamide fibre |
|---|---|---|---|---|---|---|
| 2 | $-C_{12}H_{25}$ | $-SO_3H$ | H | 5 | 2-Hydroxynaphthalene-6-sulphonic acid | scarlet |
| 3 | $-C_{10}H_{21}$ | $-SO_3H$ | H | 5 | ″ | ″ |
| 4 | $-C_8H_{17}$ | ″ | H | 5 | ″ | ″ |
| 5 | $-CH_2CHC_4H_9$ \| $C_2H_5$ | ″ | H | 5 | ″ | ″ |
| 6 | ″ | ″ | H | 4 | ″ | ″ |
| 7 | ″ | H | H | 4 | ″ | ″ |
| 8 | ″ | H | H | 5 | ″ | scarlet |
| 9 | ″ | H | H | 5 | 2-Hydroxynaphthalene-8-sulphonic acid | ″ |
| 10 | ″ | H | H | 4 | ″ | ″ |
| 11 | ″ | $-SO_3H$ | H | 4 | ″ | ″ |
| 12 | ″ | ″ | H | 5 | ″ | scarlet |
| 13 | ″ | ″ | $-CH_3(5)$ | 5 | ″ | orange |
| 14 | ″ | $-Cl$ | H | 4 | ″ | ″ |
| 15 | ″ | $-CH_3$ | $-CH_3(5)$ | 4 | ″ | ″ |
| 16 | $-C_{12}H_{25}$ | $-SO_3H$ | H | 5 | ″ | ″ |
| 17 | $-C_{10}H_{21}$ | ″ | H | 5 | ″ | ″ |
| 18 | 2,2,6-trimethylcyclohexyl  | $-SO_3H$ | H | 5 | 2-Hydroxynaphthalene-8-sulphonic acid | scarlet |
| 19 | ″ | ″ | H | 4 | ″ | ″ |
| 20 | ″ | H | H | 5 | 2-Hydroxynaphthalene-3,6-disulphonic acid | ″ |
| 21 | $-C_{12}H_{25}$ | ″ | H | 5 | ″ | ″ |
| 22 | $-C_{10}H_{21}$ | ″ | H | 5 | ″ | ″ |
| 23 | ″ | ″ | H | 4 | ″ | orange |
| 24 | ″ | ″ | H | 5 | 2-Hydroxynaphthalene-6,8-disulphonic acid | scarlet |
| 25 | $-C_{12}H_{25}$ | ″ | H | 5 | ″ | ″ |
| 26 | ″ | ″ | H | 4 | ″ | orange |
| 27 | $-CH_2CHC_4H_9$ \| $C_2H_5$ | $-SO_3H$ | H | 5 | 2-Hydroxynaphthalene | scarlet |
| 28 | 2,2,6-trimethylcyclohexyl 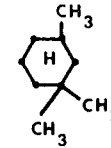 | ″ | H | 5 | ″ | ″ |
| 29 | $-C_{12}H_{25}$ | $-SO_3H$ | H | 5 | 2-Hydroxynaphthalene-7-sulphonic acid | scarlet |
| 30 | ″ | ″ | H | 5 | 1-Hydroxynaphthalene-4-sulphonic acid | ″ |
| 31 | $-C_{10}H_{21}$ | ″ | H | 5 | ″ | ″ |
| 32 | $-C_{12}H_{25}$ | ″ | H | 5 | 1-Hydroxynaphthalene-3-sulphonic acid | red |
| 33 | $-C_{10}H_{21}$ | ″ | H | 5 | ″ | ″ |
| 34 | $-CH_2CHC_4H_9$ \| $C_2H_5$ | ″ | H | 5 | ″ | ″ |
| 35 | ″ | H | H | 5 | ″ | ″ |
| 36 | ″ | ″ | H | 4 | ″ | scarlet |
| 37 | ″ | ″ | H | 5 | 1-Hydroxynaphthalene-3,6-disulphonic acid | red |
| 38 | ″ | ″ | H | 4 | ″ | scarlet |
| 39 | $-C_{12}H_{25}$ | ″ | H | 5 | ″ | red |
| 40 | $-C_{10}H_{21}$ | $-CH_3$ | H | 4 | ″ | scarlet |
| 41 | $-C_{10}H_{21}$ | H | Cl(5) | 4 | ″ | ″ |
| 42 | $-C_8H_{17}$ | H | H | 5 | ″ | red |
| 43 | 2,2,6-trimethylcyclohexyl  | H | H | 5 | 1-Hydroxynaphthalene-3,6-disulphonic acid | scarlet |

| Exp. No. | R | $R_1$ | $R_2$ (position in the ring A) | Position of the radical NHCOOR in the ring A | Coupling Component K | Shade on Polyamide fibre |
|---|---|---|---|---|---|---|
| 44 | (cyclohexyl with C(CH3)3) | H | H | 5 | " | " |
| 45 | $-C_{12}H_{25}$ | H | H | 5 | 1-Hydroxynaphthalene-3,8-disulphonic acid | " |
| 46 | $-CH_2-\overset{C_2H_5}{\underset{}{C}}HC_4H_9$ | H | H | 5 | " | " |
| 47 | (phenyl) | H | H | 5 | 2-Hydroxynaphthalene-8-sulphonic acid | scarlet |
| 48 | $-C_6H_{13}$ | H | H | 5 | " | " |
| 49 | $-C_{18}H_{37}$ | $-SO_3H$ | H | 5 | " | " |
| 50 | (o-methylcyclohexyl) | $-SO_3H$ | H | 5 | " | " |
| 51 | (p-methylphenyl) | $-SO_3H$ | H | 5 | 1-Hydroxynaphthalene | " |
| 52 | $-CH_2\overset{}{\underset{C_2H_5}{C}}H-C_4H_9$ | $-SO_3H$ | H | 5 | " | " |
| 53 | (phenyl) | $-CH_3$ | H | 5 | 2-Hydroxynaphthalene-8-sulphonic acid | " |
| 54 | " | $-CH_2Cl$ | H | 5 | " | " |
| 55 | " | $-C_2H_5$ | H | 5 | " | " |
| 56 | " | $-Cl$ | H | 5 | " | " |
| 57 | (p-methylphenyl) | $-Cl$ | H | 4 | 2-Hydroxynaphthalene-8-sulphonic acid | orange |
| 58 | $-CH_2\overset{}{\underset{C_2H_5}{C}}HC_4H_9$ | $-Cl$ | H | 5 | " | scarlet |
| 59 | $-C_{12}H_{25}$ | $-Cl$ | H | 5 | 2-Hydroxynaphthalene-6,8-disulphonic acid | " |
| 60 | " | $-Cl$ | H | 5 | 1-Hydroxynaphthalene-3,6-disulphonic acid | red |

Representative of the dyes produced in the foregoing Examples are the following:

EXAMPLE 9

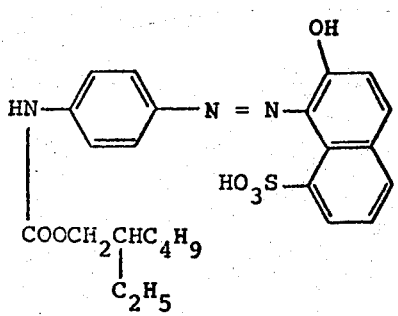

EXAMPLE 10

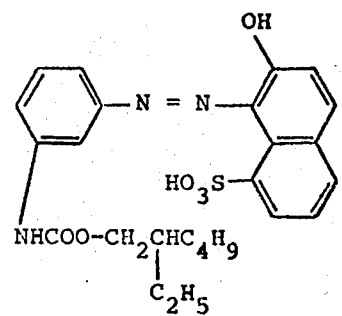

EXAMPLE 16

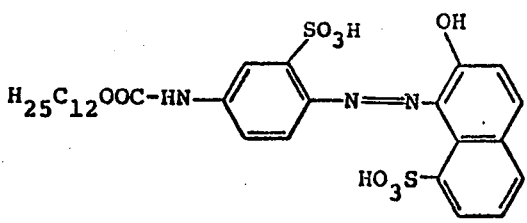

EXAMPLE 25

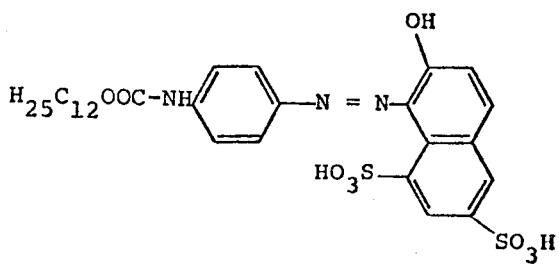

EXAMPLE 32

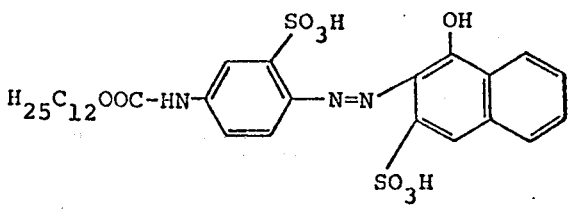

EXAMPLE 39

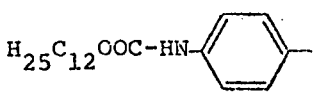

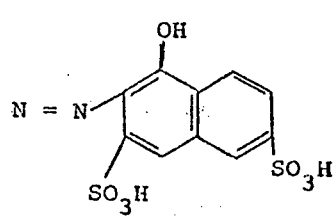

APPLICATION EXAMPLE

A dyebath is prepared with 4000 parts of water, 10 parts of anhydrous sodium sulphate and 2 parts of the dye of Example 1. After previous wetting out, 100 parts of a fabric of synthetic polymaide fibre, e.g. nylon, are entered into the bath at 40°. The bath is raised to the boil in 30 minutes and held at the boil for 1 hour, on which 4 parts of glacial acetic acid are added and dyeing continued for a final 30 minutes at the boil. The water lost by evaporation is continuously replaced during dyeing. On removal from the bath the orange dyed nylon is rinsed with water and dried. Wool also can be dyed by this method. The dyeings have good light and wet fastness properties.

What is claimed is:

1. A compound of the formula

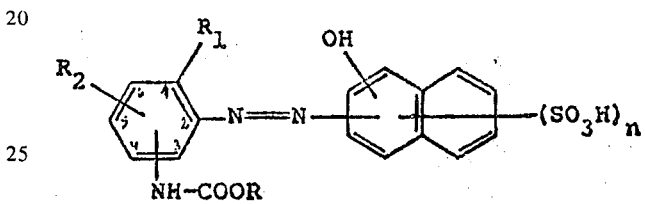

or a salt thereof, wherein

R is alkyl of 6 to 18 carbon atoms, substituted alkyl of 6 to 18 carbon atoms, cyclohexyl or substituted cyclohexyl, $R_1$ is hydrogen, halo, alkyl of 1 to 18 carbon atoms, substituted alkyl of 1 to 18 carbon atoms or sulfo, $R_2$ is hydrogen, halo, alkyl of 1 to 18 carbon atoms or substituted alkyl of 1 to 18 carbon atoms, and n is 0, 1 or 2, with the proviso that the compound contains at least one sulfo group, wherein each substituent of each substituted alkyl is independently halo, hydroxy, cyano, alkoxy of 1 to 6 carbon atoms, phenyl, substituted phenyl, naphthyl or substituted naphthyl, wherein each substituted phenyl and substituted naphthyl independently has 1 to 2 substituents and each substituent is independently halo, cyano, nitro, hydroxy, trifluoroalkyl of 1 to 6 carbon atoms, trichloroalkyl of 1 to 6 carbon atoms, alkyl of 1 to 6 carbon atoms, cycloalkyl of 5 to 7 carbon atoms, phenyl, naphthyl, alkoxy of 1 to 6 carbon atoms, phenoxy, naphthyloxy, alkoxycarbonyl of 2 to 7 carbon atoms, sulfamoyl, alkylsulfonyl of 1 to 6 carbon atoms, phenylsulfonyl, naphthylsulfonyl, carbamoyl or sulfo, each substituent of each substituted cyclohexyl is independently alkyl of 1 to 6 carbon atoms, alkoxy of 1 to 6 carbon atoms or halo, and each halo is independently fluoro, chloro, bromo or iodo.

2. A compound according to claim 1, or a salt thereof, wherein each substituent of each substituted alkyl is independently halo, hydroxy, cyano, alkoxy of 1 to 6 carbon atoms, phenyl, substituted phenyl, naphthyl or substituted naphthyl, wherein each substituted phenyl and substituted naphthyl independently has 1 or 2 substituents and each substituent is independently halo, cyano, nitro, hydroxy, trifluoroalkyl of 1 to 6 carbon atoms, trichloroalkyl of 1 to 6 carbon atoms, alkyl of 1 to 6 carbon atoms, cycloalkyl of 5 to 7 carbon atoms, phenyl, naphthyl, alkoxy of 1 to 6 carbon atoms, phenoxy, naphthyloxy, sulfamoyl, carbamoyl or sulfo.

3. A compound according to claim 2, or a salt thereof, wherein
each substituted alkyl is monosubstituted.

4. A compound according to claim 2, or a salt thereof, wherein
each substituent of each substituted alkyl is independently halo, hydroxy, cyano, alkoxy of 1 to 6 carbon atoms, phenyl or naphthyl.

5. A compound according to claim 4 or a salt thereof, wherein
R is alkyl of 6 to 18 carbon atoms, alkyl of 6 to 18 carbon atoms substituted by halo, hydroxy, cyano, alkoxy of 1 to 6 carbon atoms, phenyl or naphthyl, cyclohexyl or substituted cyclohexyl having 1 to 3 substituents wherein each substituent is alkyl of 1 to 6 carbon atoms, alkoxy of 1 to 6 carbon atoms or halo,
R₁ is hydrogen, halo, sulfo, alkyl of 1 to 18 carbon atoms or alkyl of 1 to 18 carbon atoms substituted by halo, hydroxy, cyano, alkoxy of 1 to 6 carbon atoms, phenyl or naphthyl, and
R₂ is hydrogen, halo, alkyl of 1 to 18 carbon atoms or alkyl of 1 to 18 carbon atoms substituted by halo, hydroxy, cyano, alkoxy of 1 to 6 carbon atoms, phenyl or naphthyl.

6. A compound according to claim 5, or a salt thereof, wherein
R is alkyl of 6 to 18 carbon atoms, cyclohexyl or substituted cyclohexyl having 1 to 3 substituents wherein each substituent is alkyl of 1 to 6 carbon atoms, alkoxy, of 1 to 6 carbon atoms or halo,
R₁ is hydrogen, halo, sulfo or alkyl of 1 to 18 carbon atoms, and
R₂ is hydrogen, halo or alkyl of 1 to 18 carbon atoms.

7. A compound according to claim 6, or a salt thereof, wherein
R is alkyl of 8 to 12 carbon atoms, cyclohexyl or cyclohexyl having 1 to 3 substituents wherein each substituent is independently halo, alkyl of 1 to 6 carbon atoms or alkoxy of 1 to 6 carbon atoms,
R₁ is hydrogen, halo, alkyl of 1 to 6 carbon atoms or sulfo, and
R₂ is hydrogen, halo or alkyl of 1 to 6 carbon atoms.

8. A compound according to claim 7, or a salt thereof, wherein
R₁ is hydrogen, chloro, alkyl of 1 to 6 carbon atoms or sulfo, and
R₂ is hydrogen, chloro or methyl.

9. A compound according to claim 8, or a salt thereof, wherein
R is alkyl of 8 to 12 carbon atoms, cyclohexyl or cyclohexyl substituted by 1 to 3 methyl groups.

10. A compound according to claim 9, or a salt thereof, wherein
the —NH—COOR group is in the 4- or 5-position and the hydroxy and azo groups are in the 1- and 2-positions of the naphthalene ring.

11. A compound according to claim 10 having the formula

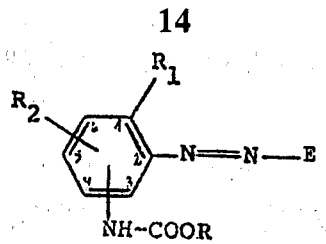

or a salt thereof, wherein
E is 2-hydroxynaphthyl-1, 2-hydroxy-6-sulfonaphthyl-1, 2-hydroxy-7-sulfonaphthyl-1, 2-hydroxy-8-sulfonaphthyl-1, 2-hydroxy-3,6-disulfonaphthyl-1, 2-hydroxy-6,8-disulfonaphthyl-1, 1-hydroxynaphthyl-2, 1-hydroxy-3-sulfonaphthyl-2, 1-hydroxy-4-sulfonaphthyl-2, 1-hydroxy-3,6-disulfonaphthyl-2 or 1-hydroxy-3,8-disulfonaphthyl-2.

12. A compound according to claim 11, or an alkali metal or ammonium salt thereof.

13. A compound according to claim 12, or a sodium salt thereof.

14. A compound according to claim 4, or a salt thereof, wherein
each substituted alkyl is monosubstituted.

15. A compound according to claim 4, or an alkali metal or ammonium salt thereof.

16. An alkali metal or ammonium salt according to claim 15.

17. A sodium salt according to claim 16.

18. A compound according to claim 4 having two sulfo groups, or a salt thereof.

19. A compound according to claim 4 having the formula

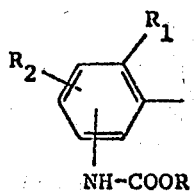

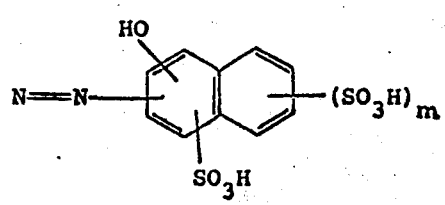

or a salt thereof wherein
m is 0 or 1.

20. A compound according to claim 4 having the formula

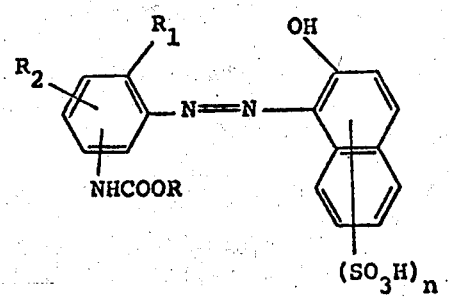

or a salt thereof.

21. A compound according to claim 20 having the formula

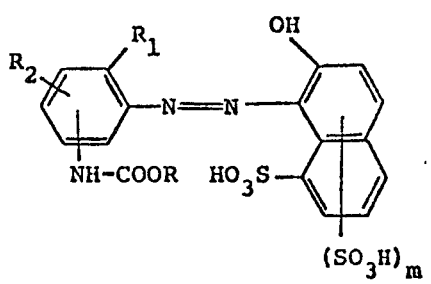

or a salt thereof, wherein
m is 0 or 1.

22. A compound according to claim 4 having the formula

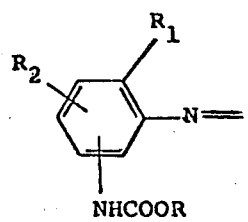

or a salt thereof.

23. A compound according to claim 22 having the formula

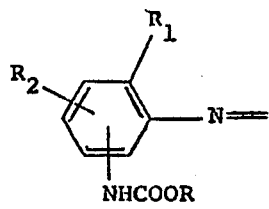

or a salt thereof, wherein
m is 0 or 1.

24. A compound according to claim 4, or a salt thereof, wherein
the —NH—COOR group is in the 4-position.

25. A compound according to claim 4, or a salt thereof, wherein
the —NH—COOR group is in the 5-position.

26. A compound according to claim 4, or a salt thereof, wherein
R is alkyl of 6 to 18 carbon atoms, cyclohexyl or substituted cyclohexyl having 1 to 3 substituents wherein each substituent is independently alkyl of 1 to 4 carbon atoms, $R_1$ is hydrogen, chloro, methyl, ethyl, chloromethyl or sulfo, and $R_2$ is hydrogen, chloro or methyl.

27. A compound according to claim 26, or a salt thereof, wherein
the —NH—COOR group is in the 4 or 5-position and the hydroxy and azo groups are in the 1- and 2-positions of the naphthalene ring.

28. A compound according to claim 27 having the formula

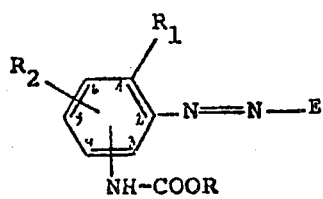

or a salt thereof, wherein
E is 2-hydroxynaphthyl-1, 2-hydroxy-6-sulfonaphthyl-1, 2-hydroxy-7-sulfonaphthyl-1, 2-hydroxy-8-sulfonaphthyl-1, 2-hydroxy-3,6-disulfonaphthyl-1, 2-hydroxy-6,8-disulfonaphthyl-1, 1-hydroxynaphthyl-2, 1-hydroxy-3-sulfonaphthyl-2, 1-hydroxy-4-sulfonaphthyl-2, 1-hydroxy-3,6-disulfonaphthyl-2 or 1-hydroxy-3,8-disulfonaphthyl-2.

29. A compound according to claim 28, or a salt thereof, wherein
R is alkyl of 6 to 18 carbon atoms, cyclohexyl, t-butylcyclohexyl or cyclohexyl substituted by 1 to 3 methyl groups,
$R_1$ is hydrogen, chloro, methyl or sulfo, and
$R_2$ is hydrogen.

30. A compound according to claim 29, or a salt thereof, wherein
R is alkyl of 6 to 18 carbon atoms, cyclohexyl, methylcyclohexyl, 3,3,5-trimethylcyclohexyl or 4-t-butylcyclohexyl.

31. A compound according to claim 30, or an alkali metal or ammonium salt thereof.

32. A compound according to claim 31, or a sodium salt thereof,

33. The compound according to claim 30 having the formula

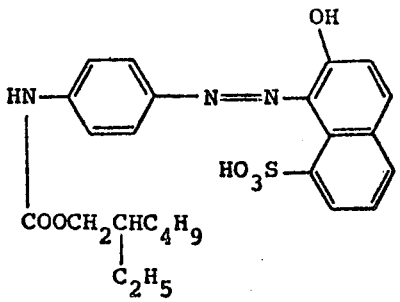

or a salt thereof.

34. The compound according to claim 30 having the formula
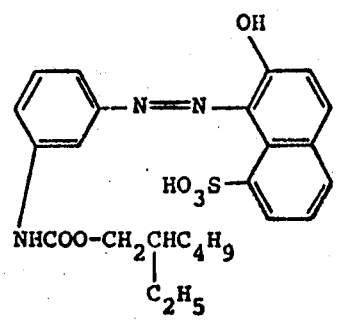
or a salt thereof.
35. The compound according to claim 30 having the formula
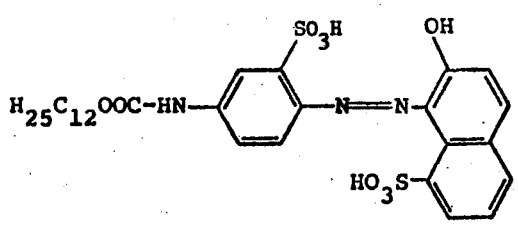
or a salt thereof.
36. The compound according to claim 30 having the formula
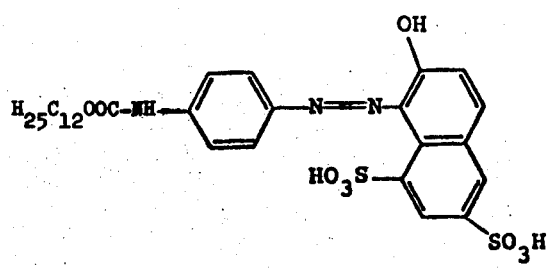
or a salt thereof.
37. The compound according to claim 30 having the formula
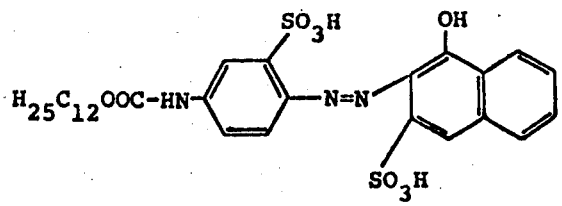
or a salt thereof.
38. The compound according to claim 30 having the formula
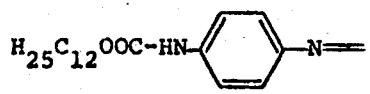
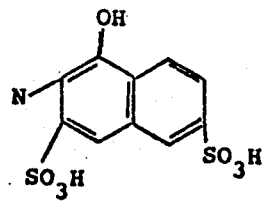
or a salt thereof.
* * * * *